Jan. 2, 1945.  P. F. K. ERBGUTH  2,366,246
REGULATING INSTRUMENT
Filed Jan. 7, 1941
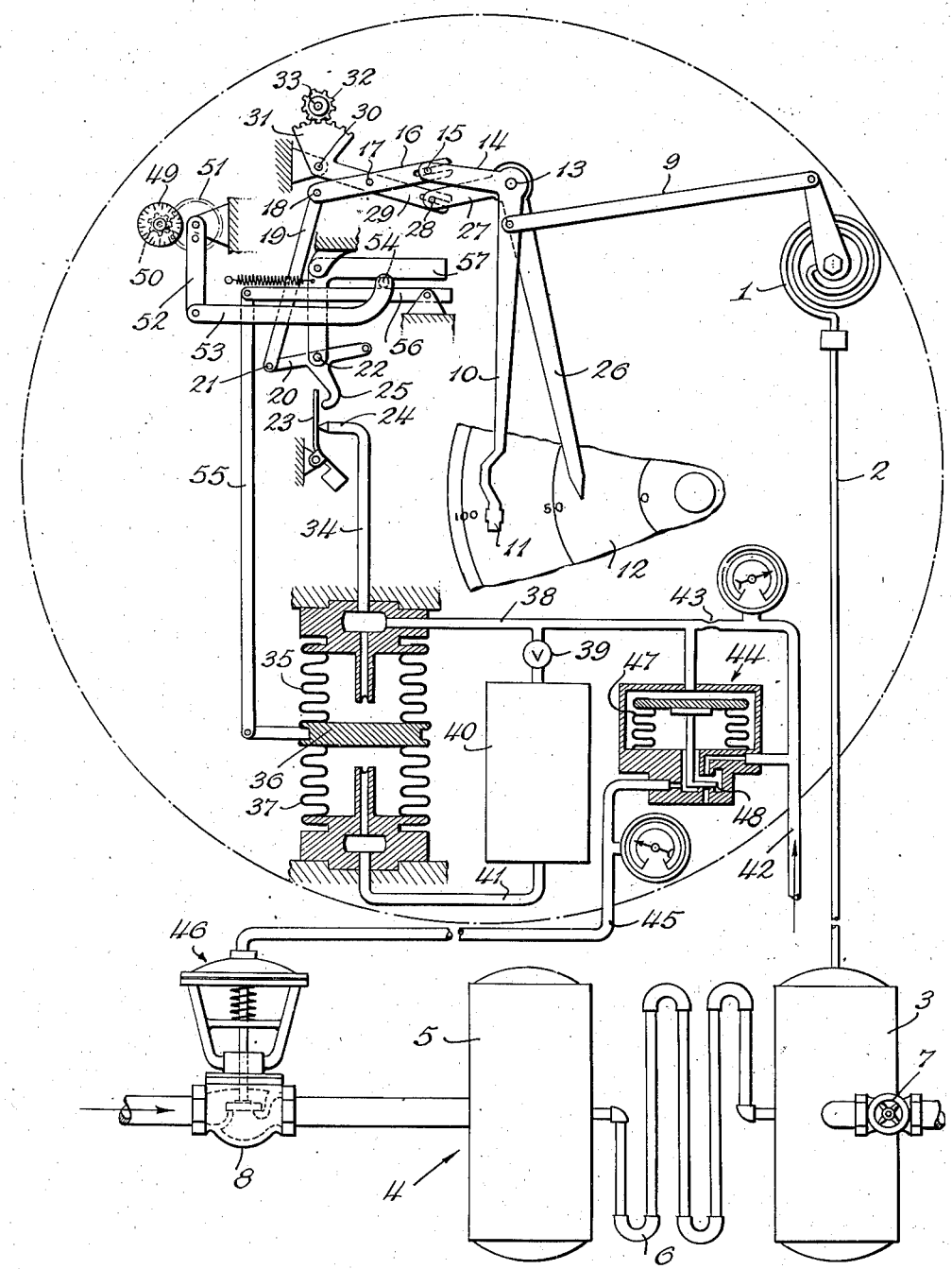
INVENTOR.
PAUL F. K. ERBGUTH
BY
AGENT Patented Jan. 2, 1945

2,366,246

UNITED STATES PATENT OFFICE 2,366,246

REGULATING INSTRUMENT

Paul F. K. Erbguth, Brooklyn, N. Y., assignor to Charles J. Tagliabue Mfg. Co., Brooklyn, N. Y., a corporation of New York Application January 7, 1941, Serial No. 373,469

6 Claims. (Cl. 50—10)

The present invention relates to improved means and combinations in a fluid-operated regulator for automatically maintaining a physical variable such as, e. g., pressure, level, flow rate, or voltage at a predetermined value. It particularly relates to an improved air-operated regulator of what is known as the "reset" type although "pseudo-reset" is more accurate since there is ultimate correspondence of the measured value of the variable which governs the regulation with the position of the final controlling element which controls either the measured variable or another affecting it. However, as hereinafter appears, it is not limited to reset type regulators.

This regulator is shown by way of example in an instrument in which the measured values of a variable pressure are recorded on a chart. This instrument is provided with a means for manually setting the mean ultimate value of the pressure which it is desired that the instrument substantially maintain. In a reset-type regulator, the rate of change of this pressure is sensed by a differential bellows or the like and both the value and the rate of the departure of the pressure from its set value are used to govern the controlling action of a flapper-pilot upon an air pressure. Only the sensitivity of this rate component is adjustable which adjustment, however, is adequate since altering this component determines the amount of the initial response of the regulator and hence determines the stability. This method of control gives a resetting effect in a broad sense by providing a low initial sensitivity of response of the controller to a change of the measured value of the pressure and a higher ultimate sensitivity. A relay is actuated by the air pressure which is governed by the pilot to correspondingly alter an air-pressure on a diaphragm motor of the spring-opposed type which positions a final controlling valve which in this case throttles the flow of steam to the plant whose pressure is being regulated. This plant is shown as including two capacities separated by a resistance to emphasize the fact that there is a serious lag between a movement of the controlling steam supply valve and the resultant change of pressure which reaches the recorder. All of the elements involved above are per se well known in this art. The invention resides in the selection and arrangement of the elements and particularly in the means by which the setting is changed and by which the reset sensitivity is adjusted. While others have used the relay-governed pressure to modify the pilot-governed pressure to introduce either an amount or rate of departure component, I have provided for the first time in connection with a relay device such a component which is derived directly from the pilot-governed pressure with a real gain in both the promptness and accuracy of response to changes of the variable.

The principal object of the invention is consequently to provide improved fluid-operated means, and combinations of elements for more promptly and accurately regulating a variable. This is in connection with either a prompt followup, a delayed followup or with a reset action obtained directly from a pilot-governed fluid pressure.

Another main object of the invention is to provide an improved linkage by which both the departure and rate of departure components are rendered effective. A related object is the provision of an improved means for adjusting the sensitivity of the rate or reset component. Still another object is to provide an improved setting means. More general objects are to provide an improved regulator which is substantially independent of change of the pressure of the air supply and to provide a reset having a sensitivity adjustment, both of which are simple, compact and accessible.

These and other objects of my invention will appear to those skilled in the art from the accompanying drawing and specification, in which are illustrated and described several embodiments of the invention, it being my intention to claim all that I have disclosed which is inventive, new and useful.

The somewhat diagrammatic drawing is the front elevation of the regulator with parts of the instrument in section, the plant being shown on a more reduced scale than is the instrument. In the drawing, bourdon I is connected by pressure pipe 2 with capacity tank 3 of the plant 4 which includes another capacity tank 5 which is connected with the tank 3 by a reduced piping 6 which acts as a resistance to flow from tank 5 to tank 3. Tank 3 is provided with outlet valve 7 while a supply of steam to tank 5 is throttled by inlet valve 8. From the standpoint of controllability, this plant has a real and considerable lag since it consists of two capacitors separated by a resistor.

Bourdon I is connected by link 9 with pen arm 10 which moves pen 11 over chart 12 which is rotated in the usual manner by a clock (not shown), e. g., once every 24 hours. Pen arm 10 is pivoted on fixed 13 and provided with an arm 14 which, with pen arm 10, forms a bell crank. At the outer end of arm 14 is a pin 15 which cooperates with a slot in the end of a straight lever 16 which is mounted on a movable pivot 17 and whose other end is provided with a pivot 18. These parts are arranged so that, upon an increase of pressure in tank 3, bourdon 1 moves link 9 and pen 11 to the left so that pin 15 is raised and pivot 18 lowered.

Link 19 connects pivot 18 with bell crank 20, the lower end of link 19 being provided with a pin 21 which cooperates with one of two bearing-holes in bell crank 20. When the control is "direct acting," an increase of pressure in bourdon 1 causes an increase of pressure in the governing system. In this case, the depending end 25 and the pivot 22 of bell crank 20 are so located relative to flapper 23 for nozzle 24 that a downward movement of link 19 causes a counterclockwise movement of bell crank 20 and causes the depending end portion 25 thereof to move to the right away from flapper 23 which is counterweighted to then abut its nozzle 24. To make this portion of the device reverse-acting, it is only necessary to shift pin 21 from the left-hand hole to the right-hand hole of bell crank 20.

It is seen that with fixed positions of pivots 17 and 22, the sensitivity of response of the flapper to a change in the pressure in bourdon 1 has a certain definite value. However, as will be pointed out below, pivot 22 is not fixed but instead is movable in accordance with the rate of change of the value of the pressure in nozzle 24. The set point is indicated by an index on lever arm 26 which is pivoted upon pivot 13 of the pen arm 10 and has its indicating end at only slightly less than the radius therefrom of pen 11. Like pen arm 10, index arm 26 also forms a lever in which an arm 27, like arm 14, extends to the left in the figure and is provided with pin 28. Lever 29 has a slotted end which cooperates with pin 28 and is pivotally mounted on a fixed pivot 30. Its other end is provided with a segmental gear 31 which is positioned by a pinion gear 32, which is affixed to the manually-operable knob 33. Lever 29 carries pivot 17 for lever 16. The manual operation of knob 33 in a clockwise direction raises pivot 17 and moves the index arm 26 to the left.

Line 34 connects nozzle 24 with bellows 35 whose movable end consists of a disc 36. Bellows 37 opposes bellows 35 and disc 36 also comprises its movable end. The interiors of bellows 35 and 37 are connected by line 38, valve 39, capacity tank 40 and line 41, the valve 39 being interposed between bellows 35 and capacity tank 40 so that capacity tank 40 introduces a lag of bellows 37 behind bellows 35. The position of disc 36 accordingly depends upon the rate of change of the pressure in nozzle 24 to which bellows 35 and 37 are connected. Air supply line 42 is connected through throttling restriction 43 with line 38. Relay 44 is connected with line 38 so as to be governed by the pressure in nozzle 24 to set up a corresponding pressure in line 45 which connects relay 44 with diaphragm motor 46 for spring-opposed inlet valve 8 which is shown as of the "direct-acting" type, i. e., one in which an increase of pressure to the diaphragm motor causes a closing of the valve. Relay 44 includes a differential pressure bellows 47 which is responsive to the difference of pressure in lines 38 and 45. The movable end of bellows 47 operates relay valve 48 which is of the supply-and-escape type so that line 45 is connected to the atmosphere when valve 48 is in its upper limiting position and to air supply line 42 when relay valve 48 is in its lower limiting position. Although ordinarily of the type in which a ball seats against circular ports, relay valve 48 is shown somewhat diagrammatically since any free-acting valve may be used.

Graduated knob 49 is provided to adjust the initial sensitivity of the reset. This knob is attached to pinion gear 50 which meshes with spur gear 51 to which an arm 52 is affixed. One end of link 53 is pivotally attached to arm 52, its other end being provided with pin or roller 54 which acts as an adjustable fulcrum for altering the initial sensitivity. Reset disc 36 is mechanically connected with link 55 which is pivotally connected with the left-hand end of lever 56 along whose upper edge pin 54 is longitudinally movable so that pin 54 moves, for each unit movement of reset disc 36, a vertical distance which depends upon the position of graduated knob 49.

Bell crank 57 is located as shown relative to lever 56 to have its upper arm substantially parallel to lever 56 and its depending arm approximately vertical and carrying pivot 22 for bell crank 20, the arrangement being such that, when pin 54 is set well over to the right, it is moved less vertically as aforementioned by lever 56 and pin 54 also moves bell crank 57 less angularly per unit movement of pin 54 since the distance of pin 54 from the fixed pivot of bell crank 57 has also been increased. The result is that a clockwise movement of knob 49 causes pin 54 to move to the right so as to cause pivot 22 and the pushing end portion 25 of bell crank 20 to move less per unit movement of reset disc 36 than would occur if a lineal relation existed.

The use of bellows 35 with a reactive operative connection to the flapper 23 frees the pilot-system, whose air pressure governs the regulation, from any appreciable effect of sudden changes of the pressure of the air supply. The use of bellows 47 likewise reduces the effect of such changes upon the relay-governed system and hence upon the position of valve 8.

The operation of this device is as follows: A reduction in the demand on the plant 4 follows a movement of outlet valve 7 to partially throttle the outlet. The pressure in tank 3 immediately starts to rise at a rate which depends upon the amount of throttling added. Neglecting any lag in pressure line 2, bourdon 1 immediately starts to gradually move link 9 to the left so that pen 11 moves upscale on chart 12 from the setting point which is indicated by index arm 26. This raises pin 15 which turns lever 16 in a counterclockwise direction about its pivot 17, thus depressing link 19 and turning bell crank 20 in a counterclockwise direction about its pivot 22. This allows counterweighted flapper 23 to close against its nozzle 24 so that the pressure promptly builds up therein, in line 34 and in bellows 35 thus forcing reset disc 36 downwards along with link 55 and pin 54. Consequently bell crank 57 turns in a clockwise direction to move pivot 22 to the left which movement tends to at least partially offset the effect upon the flapper 23 of the initial movement of pen 11 itself to the left on chart 12. When disc 36 moves downward, the upper surface of differential bellows 47 is acted upon by the increased pressure in line 34 which is connected with relay 44 by line 38. This forces relay valve 48 downward as shown so that air under pressure from supply line 42 is admitted to the lower side of the differential bellows 47 and to line 45 to diaphragm motor 46 so that inlet valve 8 is partially further closed almost immediately to partially offset the additional throttling provided by outlet valve 7.

Then, the increased pressure in bellows 35 causes a resultant flow of air through valve 39 and the capacity tank 40 to bellows 37 so that disc 36 tends to stop moving in a downward direction and to return toward its normal position in which there is no pressure difference between bellows 35 and 37. The rate of movement of disc 36 decreases as its normal position is approached so that its normal position is asymptotically approached. This results in a return at a gradually decreasing rate of upward movement of link 55 and pin 54 so that bell crank 57 is turned in a counterclockwise direction to move pivot 22 gradually to the right and along with it the lower end portion 25 of bell crank 20 which is pivoted upon pivot 22. The result is that crank end 25 tends to move to the right away from flapper 23 but at such a low rate that stability is maintained and flapper 23 is ultimately left in a throttling position relative to its nozzle 24 and so that the ultimate value of the air pressures in nozzle 24 and in lines 34 and 38 and in line 45 and diaphragm motor 46 all correspond with the pressure in bourdon 1.

As is apparent from an inspection of the drawing, the arrangement of the index arm 26, pen arm 10 and their respective levers 29 and 16 is such as to provide a highly accessible device for setting the mean value of the pressure which it is desired that the regulator maintain. This device has few moving parts and the weight of arms 16 and 27 effectively removes any backlash.

Likewise the arrangement of the means moved by graduated knob 49 for adjusting the initial sensitivity is simple, highly accessible and follows a particularly advantageous law as regards the provision of open spacing of the graduations over a wide range of sensitivity. It is apparent that, when pin 54 is moved to be directly over the fixed pivot of lever 56, there will be no movement of the pusher end 25 of bell crank 20 against flapper 23 due to a movement of reset disc 36. By moving pin 54 to the left to a more central position, such as is shown, the operation is as earlier described herein. A separate adjustment, i. e., valve 39, is provided for altering the speed of the return of disc 36 so that it would move more rapidly for a more lively plant, e. g., one of which the resistance in piping 6 is relatively low. In other words, knob 49 serves to permit adjustment of the initial momentary value of the sensitivity of regulation while valve 39 determines the rate at which reset disc 36 paces the pressure in plant 4 back to its set value.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an instrument for governing the air pressure to a controller for a variable physical quantity to be regulated, the combination of a pivot, a measuring element which is pivoted on said pivot and whose position substantially corresponds with the actual value of the variable, an index element which is also pivoted on said pivot and whose position is manually adjustable to a position which corresponds with a set value of the variable, a pin on each of said elements, both of said pins being at approximately the same distance from said pivot and in approximate alinement with each other when said elements are in positions which correspond with the same value of the variable, a slotted lever for each of said elements, each with its slot cooperating with the pin of its respective element, a pivot for the lever which cooperates with the measuring element and is carried by the lever which cooperates with the index element, the arrangement of the above named parts being such that the unslotted end of the slotted lever which cooperates with the measuring element moves in accordance with the value of the departure of the measured value of the variable from the set value, a fixed pivot for the last mentioned lever, the axes of the two last mentioned pivots being parallel with that of the first named pivot, manually adjustable means for positioning the last mentioned lever to set the index element and to alter the position of the second named pivot, an air pilot including a valve to control the pressure which governs the controlling of the regulated variable, and means operatively connecting the pilot valve with the lever which cooperates with the measuring element to position the pilot valve in accordance with departures of the measured value of the variable from the set value.

2. In an instrument for regulating the value of a physical variable in which a pilot valve controls a fluid pressure which governs a controller for the variable to be regulated, the combination of an element moving in accordance with the value of the departure of a measured value of the variable from a set value, a bell crank for actuating said pilot valve, a link operatively connecting said element with said bell crank to cause the latter to tend to move the pilot valve upon a change of such departure in a direction to alter said pressure to oppose said change, a second bell crank which is mounted on a fixed pivot, a pivot for the first bell crank which pivot is carried by the second bell crank, an expansible means having a portion which is movable in accordance with changes in said pressure, a lever disposed approximately parallel with one arm of the second bell crank and pivotally mounted upon a fixed pivot which is at a distance along said lever from the first named fixed pivot in one direction therefrom, a link pivotally connected with said lever and mechanically connected with said movable portion, a pin abutting both said lever and the arm of the second bell crank which is parallel therewith, and manually adjustable means for altering the position of said pin along said lever and said arm to at least momentarily alter the sensitivity of regulation.

3. The combination set forth in claim 2 in which said expansible means comprises a differential pressure responsive means, and said combination includes a resistor shunting the last mentioned means.

4. An instrument for regulating the value of a physical variable by controlling a fluid pressure to govern a controller for the variable, the combination of a pivot, a measuring element which is pivoted on said pivot and whose position substantially corresponds with the actual value of the variable, an index element which is also pivoted on said pivot and whose position is manually adjustable to a position which corresponds with a set value of the variable, a pin on each of said elements, both of said pins being at approximately the same distance from said pivot and in approximate alinement with each other when said elements are in positions which correspond with the same value of the variable, a slotted lever for each of said elements, each with its slot co-ooperating with the pin of its respective element, a pivot for the lever which cooperates with the measuring element and is carried by the lever which cooperates with the index element, a fixed pivot for the last mentioned lever, the axes of the two last mentioned pivots being parallel with that of the first named pivot, manually adjustable means for positioning the last mentioned lever to set the index element and to alter the position of the second named pivot, the arrangement of the above named parts being such that the unslotted end of the slotted lever which cooperates with the measuring element moves in accordance with the value of the departure of the measured value of the variable from the set value, an air pilot including a valve to control the pressure which governs the controlling of the regulated variable, a bell crank for actuating said pilot valve, a link operatively connecting said unslotted lever-end with said bell crank to cause the latter to move the pilot valve upon a change of such departure in a direction to alter said pressure to oppose said change, a second bell crank which is mounted on a fixed pivot, a pivot for the first bell crank which pivot is carried by the second bell crank, an expansible means having a portion which is movable in accordance with changes in said pressure, a lever disposed approximately parallel with one arm of the second bell crank and pivotally mounted upon a fixed pivot which is at a distance along said lever from that of the fixed pivot for the second bell crank in one direction therefrom, a link pivotally connected with said lever and mechanically connected with said movable portion, a pin abutting both said lever and the arm of the second bell crank which is parallel therewith, and manually adjustable means for altering the position of said pin along said lever and said arm to at least momentarily alter the sensitivity of regulation.

5. The combination set forth in claim 4 in which the pivots for both bell cranks are at least approximately in line with the connection of the link with its lever, and the pivot for said lever is at least approximately normal to said line.

6. In an air-operated reset-type instrument for governing the position of a controller for a variable physical quantity to be regulated by governing the pressure of air supplied to the motor of said controller from a source of air under at least approximately constant pressure, the combination of an element whose position corresponds with a measured value of said variable; an air pilot valve mechanically connected with said element to have its position directly governed by that of said element; a reset means including an expansible means having a fluid-pressure-tight dividing wall movable from a normal position in accordance with the differential pressure across said wall, means biasing said wall toward said normal position with a force which is proportional to the displacement of said dividing wall from said normal position, a conduit fluid-pressure-connecting one side of said expansible means wall with said air pilot to have the pressure in said conduit governed in substantial correspondence with the position of said pilot valve, the other side of said expansible means being constructed to have appreciable capacity, and a fluid-pressure connection from said other side of said expansible means wall to said conduit, said fluid-pressure connection including a damping resistor, the arrangement being such that the air flow through the resistor acts to equalize the pressures on the opposite sides of said wall and hence to permit the gradual restoration of said wall to its normal position following a change in the position of the air pilot valve and consequently of that of said wall, said pilot valve being also mechanically connected with the movable wall to be actuated thereby to a position which depends upon both the position of said element and the displacement of said wall from its said normal position, the arrangement being such that said wall tends to move the pilot valve initially in the opposite direction from that due to said element upon a change of the position of the latter; and an air relay means including an air relay valve connected between said source of air and the motor of said controller, and also including a second expansible means having a second movable wall one side of which is fluid-pressure-connected with said conduit, said second movable wall being operatively connected with said relay valve to position the latter in accordance with the value of the pressure in said conduit.

PAUL F. K. ERBGUTH.